United States Patent [19]

Nakamura

[11] Patent Number: 4,563,899
[45] Date of Patent: Jan. 14, 1986

[54] ULTRASONIC IMAGING APPARATUS USING TRANSDUCER CONTROL

[75] Inventor: Kenichi Nakamura, Noda, Japan

[73] Assignee: Kabushiki Kaisha Toshiba, Japan

[21] Appl. No.: 696,054

[22] Filed: Jan. 29, 1985

[30] Foreign Application Priority Data

Jan. 31, 1984 [JP] Japan .................................. 59-15492

[51] Int. Cl.⁴ .......................................... G01N 29/06
[52] U.S. Cl. ..................................... 73/626; 128/663; 73/632
[58] Field of Search ................. 73/626, 625, 628, 641, 73/620, 632; 367/87, 90, 103, 105, 137; 128/660, 663

[56] References Cited

U.S. PATENT DOCUMENTS

| | | | |
|---|---|---|---|
| 3,979,711 | 9/1976 | Maginness et al. | 367/87 |
| 4,019,169 | 4/1977 | Takamizawa | 73/626 |
| 4,285,010 | 8/1981 | Wilcox | 73/626 |
| 4,333,347 | 6/1982 | Lang et al. | 73/632 |

*Primary Examiner*—Stephen A. Kreitman
*Attorney, Agent, or Firm*—Finnegan, Henderson, Farabow, Garrett & Dunner

[57] ABSTRACT

In an ultrasonic imaging apparatus, the pulser applies drive pulses to the transducer element. Depending upon the transducer characteristics and the scanning mode of the ultrasonic beams, the pulser is required to apply proper drive voltage to a given transducer element. The voltage selector switch is provided to select the desirable drive voltage from the power source. Further, the transistor is provided to adjust the selected drive voltage so as to obtain the most preferable drive voltage for the transducer element.

13 Claims, 10 Drawing Figures

F I G. 3
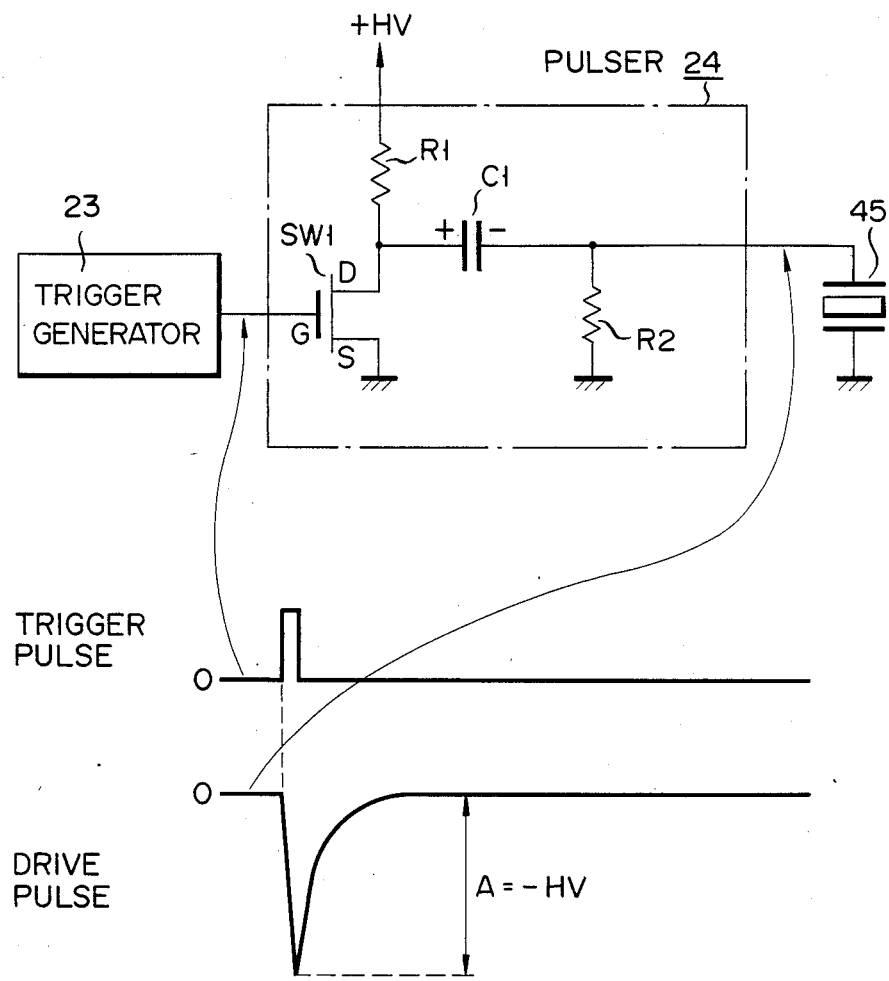

ULTRASONIC IMAGING APPARATUS USING TRANSDUCER CONTROL

BACKGROUND OF THE INVENTION

1. [Field of the Invention]

This invention relates to an ultrasonic imaging apparatus in which pulse voltages for exciting transducer elements are controlled in accordance with the scanning mode, or the transducer characteristics.

2. [Description of Prior Art]

In an ultrasonic imaging apparatus, a transducer having a plurality of transducer elements, e.g., 32, 48, 64 and 128 arranged in an array is energized by exciting pulses to transmit ultrasonic pulses toward the interior of a body, thereby receiving ultrasonic echoes reflected therefrom to produce echo signals. The echo signals contain medical information such as bloodflow conditions of the body under examination.

Generally, three typical exciting pulses are utilized in the current ultrasonic imaging apparatus. As the first exciting pulses, a single pulse is repeatedly applied to the transducer elements every rate pulse period. However, amplitudes of the reflected echo signals are gradually decreased, as the ultrasonic echos are reflected from blood cells in the bloodflow. As a result, the signal-to-noise ratio is lowered.

To avoid the above drawback, the burst drive pulses are employed. For example, the burst drive pulses having three wave numbers are produced every rate pulse period. This second exciting method can provide various merits. That is, the signal-to-noise ratio can be improved by limiting the frequency range, compared with the first exciting method. Moreover, other medical information, i.e., flow directions of the bloodflows can be obtained. However, the other problems occur. Since the power of the burst drive pulses is greater than that of the single drive pulse, the average power of the applied ultrasonic pulses increases and thus the power dissipation in the transducer elements also increases. Eventually, the heat radiation of the transducer becomes great, resulting in safety problems for a human body due to high temperatures of the transducer.

When the pulses Doppler method is introduced in the above ultrasonic imaging apparatus so as to detect the bloodflow velocity, the maximum bloodflow velocity is subjected to be limited by the rate frequency. Accordingly, the rate frequency needs to be set so high to detect such a higher bloodflow velocity. As previously described, the higher the rate frequency is set, the greater the average power of the applied ultrasonic pulses becomes and also the higher the temperature of the transducer becomes due to the power dissipation therein.

According to another method to detect such a higher bloodflow velocity, continuous wave (CW) drive pulses are utilized, whose duration is rather longer than that of the single drive pulses. However, the average power of the transmitted ultrasonic pulses and also the temperature of the transducer become higher than those in the first drive pulse.

Another drawback of the conventional imaging apparatus is caused by the scanning modes. In the sector and linear scanning modes, the power dissipation of the transducers is different from each other, since voltages of the drive (exciting) pulses derived from the pulser are constant. That is, in the linear scanning mode, several elements of the transducer are simultaneously excited by the drive pulses, but the remaining transducer elements are in the waiting condition, i.e., no power dissipation. To the contrary, all transducer elements of the sector scanning mode are simultaneously excited, so that if the maximum pulse voltage in the linear scanning mode is applied to the sector type transducer, the temperature of the sector type transducer is necessarily higher than the allowable temperature thereof.

In other words, if the power dissipation, or the temperature increase of both the transducers is maintained constant, the signal-to-noise ratio of the lower temperature transducer (i.e., the linear type transducer) is degraded. Such trade-off conditions cannot be sufficiently solved in the conventional imaging apparatus.

It is therefore an object of the present invention to efficiently drive the transducer elements under the suitable drive voltages in the ultrasonic imaging apparatus.

SUMMARY OF THE INVENTION

The above object and other features of the present invention may be accomplished by providing an ultrasonic imaging apparatus comprising:

a transducer having a plurality of transducer elements arranged in an array for transmitting ultrasonic pulses toward an object under examination upon receipt of drive pulses, and for receiving ultrasonic echoes reflected from the object, thereby producing echo signals;

a transmitter including a rate pulse generator for generating rate pulses, a trigger pulse generator for generating trigger pulses in response to the rate pulses, a source for producing drive voltages for the transducer, a controller for controlling the drive voltages so as to obtain the drive pulses having a desirable mode, and a pulser for supplying to the transducer elements the drive pulses having a desirable mode upon receipt of the trigger pulses;

a receiver coupled to the transducer for processing the echo signals so as to produce tomographic image signals; and a display unit for displaying tomographic images of the object scanned by the ultrasonic pulses based upon the tomographic image signals.

BRIEF DESCRIPTION OF THE DRAWINGS

For a better understanding of the object of the present invention, reference is made to the following detailed description of the invention to be read in conjunction with the following drawings, in which:

FIG. 3 is a schematic diagram of a basic circuit of the pulser used in the apparatus shown in FIG. 1;

DETAILED DESCRIPTION OF THE PREFERRED EMBODIMENTS

Figure 1:
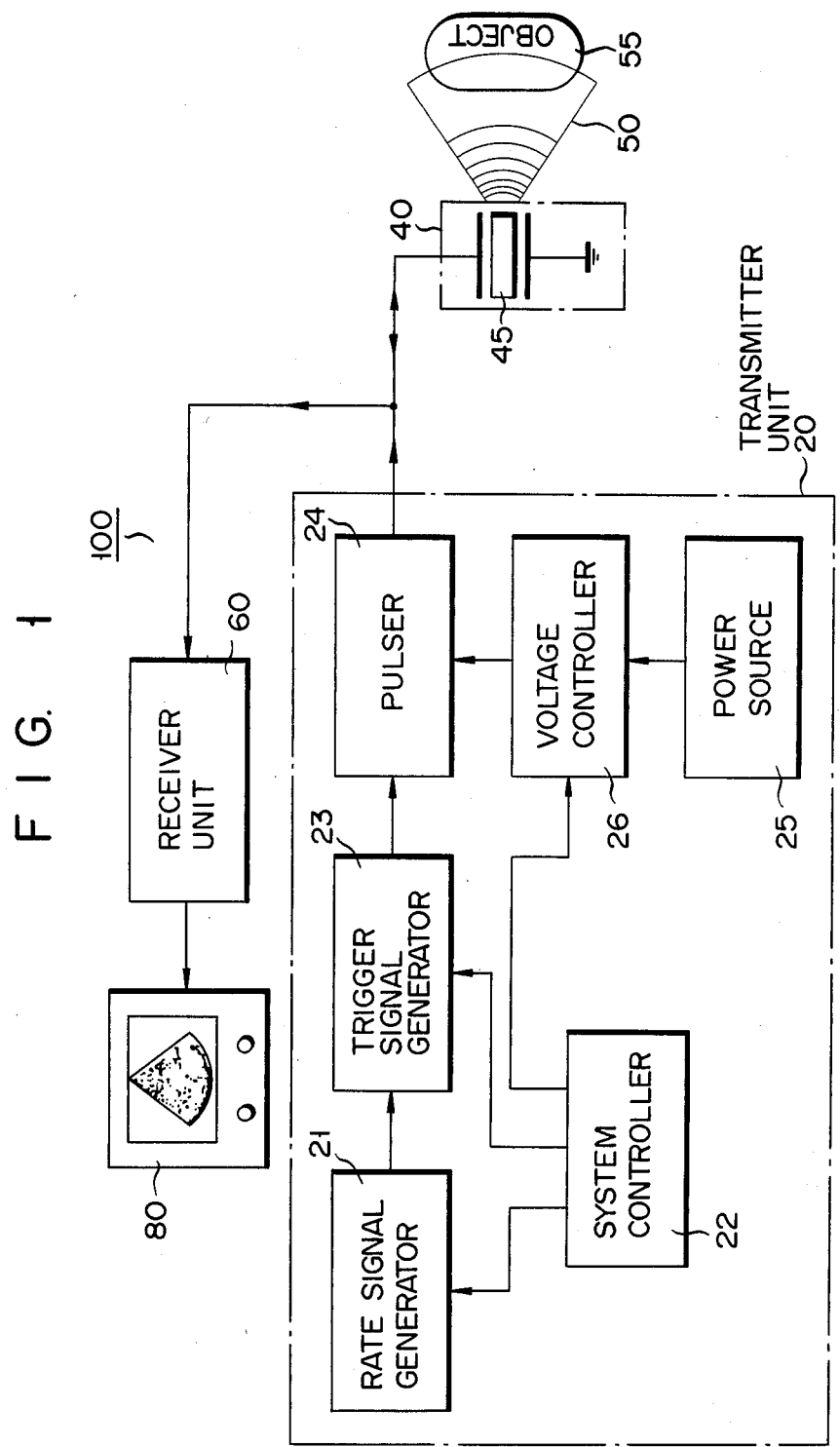
FIG. 1 is a block diagram of an ultrasonic imaging apparatus according to one preferred embodiment.

Reference first is made of FIG. 1 in which there is shown a block diagram of an ultrasonic imaging apparatus 100 according to one preferred embodiment.

Since the present invention is embodied in a transmitter unit of the ultrasonic imaging apparatus 100, a receiver unit thereof is simply illustrated in FIG. 1.

The ultrasonic imaging apparatus 100 shown in FIG. 1 is mainly constructed by a transmitter unit 20, a transducer 40, a receiver unit 60 and a display unit 80. The basic operation of this apparatus 100 is as follows. Drive pulses suitable for the specific transducer 40 are generated in the transmitter unit 20 and then applied to the transducer 40. The transducer 40 produces ultrasonic pulses 50 and transmits them toward an object such as a human body under examination 55. The ultrasonic pulses penetrate into the interior of the body 55 and are then reflected from various interior portions within the body 55. The reflected ultrasonic echoes are received by the same transducer 40 to be converted into echo signals. As to the CW scanning mode, the independent receiver transducer is additionally required. These echo signals are received in the receiver unit 60 where they are processed to obtain tomographic image signals. The tomographic image signals are then supplied to the display unit 80, whereby tomographic images of the scanned body 55 are monitored in the display unit 80.

For convenience and clarity of illustration, a plurality of transducer elements 45 of the transducer 40 are not shown in detail, but only one transducer element 45 is drawn.

Figure 2:
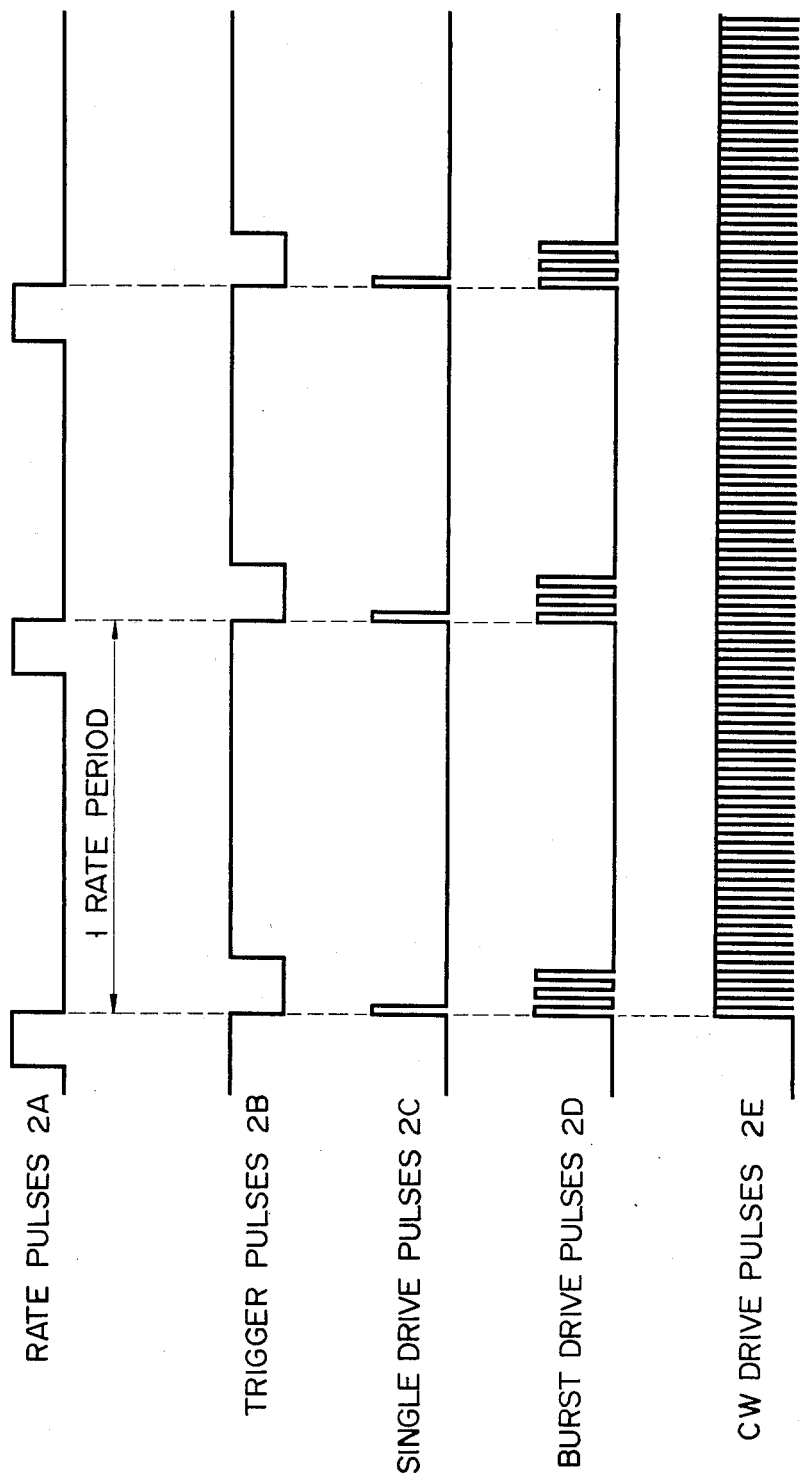
FIGS. 2A to 2E show waveforms of the respective pulses of the imaging apparatus in FIG. 1.

Referring back to the internal circuit of the transmitter unit 20, rate pulses are generated in a rate pulse generator 21 under the control of a system controller 22 in such a manner that the frequency of the rate pulses is determined by the system controller 22 (see FIG. 2A). The rate pulses are supplied to a trigger signal generator 23. In response to the rate pulses the trigger signal generator 28 produces trigger pulses as shown in FIG. 2B. Likewise, this trigger signal generator 23 is controlled by the system controller 22 in such a way that the trigger pulses are supplied to a pulser 24 at a predetermined time (will be described in detail). High exciting (drive) voltage HV is applied from a power source 25 through a voltage controller 26 to the pulser 24. Upon receipt of the trigger pulses the high drive voltage HV is applied to a given transducer element 45 by the pulser 24. The mode of this drive voltage HV is selected by the system controller 22 from single drive pulses (FIG. 2C), burst dive pulses (FIG. 2D) and continuous wave (CW) drive pulses (FIG. 2E).

By applying the high drive voltage HV to a given transducer element 45, ultrasonic pulses 50 are generated therein and transmitted toward the body 55. Ultrasonic echoes are reflected from the boundaries and discontinuities of the body 55 and received by the same transducer 40. The converted ultrasonic echo signals are supplied from the transducer 40 to the receiver unit 60. In this receiver unit 60 the suitable signal processing is performed and thus the tomographic image signals are produced. Accordingly, the tomographic images of the scanned body 55 is displayed in the display unit 80.

A description will now be made of the operation of the pulser 24.

A basic circuit of the pulser 24 is shown in FIG. 3.

It is understood by those skilled in the art that although the polarity of the trigger pulse is opposite to that shown in FIG. 2B, there is no technical difference. The pulser 24 is constructed by a switching element, e.g., a power MOSFET SW1, a charging capacitor C1 and resistors R1, R2. A source-to-drain current path of the power MOSFET SW1 is connected to the voltage controller 26 via the resistor R1, and to the ground. A junction between the drain of the power MOSFET SW1 and the resistor R1 is connected via the charging capacitor C1 to the transducer element 45. The remaining resistor R2 is connected parallel to the transducer element 45.

When no trigger pulse is applied to the gate electrode, the power MOSFET SW1 is turned off, so that the capacitor C1 is charged by the high drive voltage HV with polarities as indicated in FIG. 3. The trigger pulses are applied from the trigger signal generator 23 under the control of the system controller 22 in such a way that the set conditions such as the wave numbers, the rate frequency and the exciting voltage are preset by the system controller 22.

Upon receipt of the trigger pulses from the trigger pulse generator 23, the power MOSFET SW1 is turned on so that the high drive voltage HV across the charging capacitor C1 is applied via the source-to-drain current path of the MOSFET SW1 to the transducer element 45. The switching timing and the waveform of the drive pulse HV are shown in FIG. 3 respectively. It is apparent that the amplitude A of the drive pulse is equal to the output high voltage HV of the power source 25. Accordingly, if the output voltage of the power source 25 is changed, the amplitude A of the drive pulse can be changed.

Figure 4:
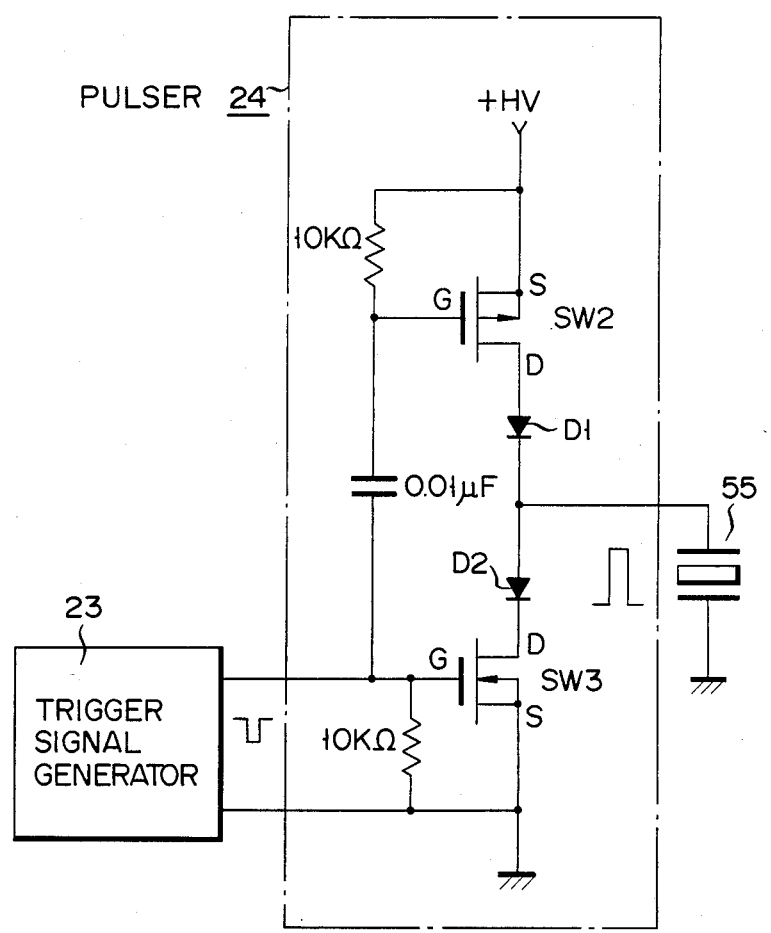
FIG. 4 is a circuit diagram of a practical pulser circuit used in the apparatus shown in FIG. 1.

In FIG. 4, a practical circuit of the pulser 24 is shown; P-channel and N-channel power MOSFET's SW2 and SW3 are series-connected between the voltage controller 26 and the ground. Since the impedance of the transducer element 55 is approximately 100 ohms and the drive voltage is about 200 V, proper circuit-design is required for the current capacity ($I_D$) and withstanding voltage ($V_{DSS}$) of the power MOSFET'S SW2 and SW3. The transducer element 55 is connected between the ground and a junction of series-connected diodes D1 and D2.

When the trigger pulse is applied to the gate electrode of the MOSFET SW3 and also to the gate electrode of the MOSFET SW2 via a capacitor having 0.01 $\mu$F, the MOSFET SW2 is turned on (conductive) and, simultaneously the MOSFET SW3 which is connected parallel to the transducer element 55 is turned off (nonconductive). As a result, the high drive voltage HV is applied to the transducer element 55 via the source-to-drain current path of the turned-on MOSFET SW2 and the diode D1. It is understood that a polarity of this drive voltage HV is opposite to that in FIG. 3. However, no technical problem exists in the pulser circuit 24 as shown in FIG. 4.

Figure 5:
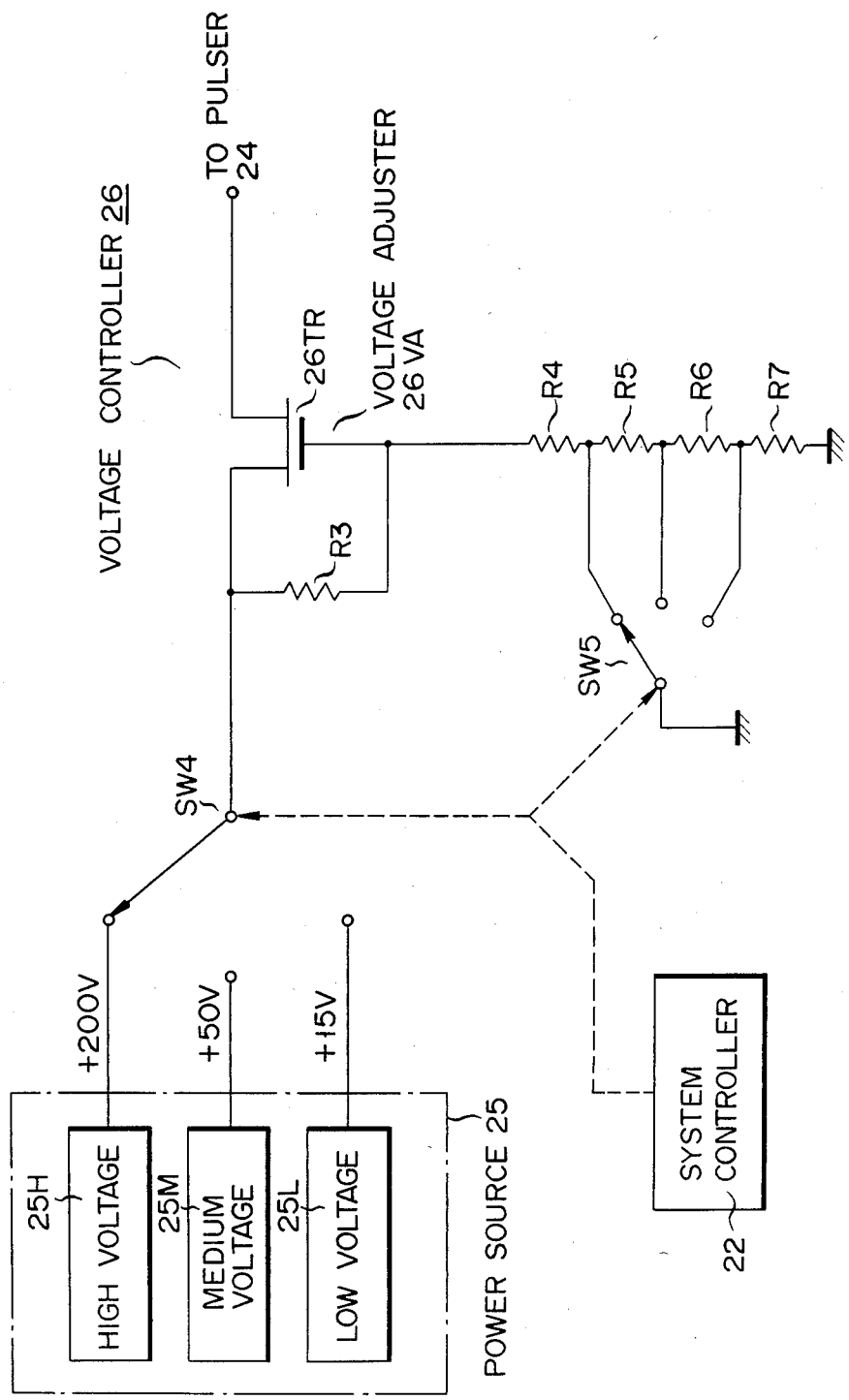
FIG. 5 is a schematic diagram of a basic circuit of the voltage controller employed in the apparatus shown in FIG. 1.

Referring to FIG. 5, a schematic circuit diagram of a basic voltage controller circuit 26 is shown. The basic circuit construction is made of an input terminal (SW4), a semiconductor voltage controlling element (26TR), and a variable resistor network.

The input terminal is connected to the power source 25. The power source 25 contains, for example, a high voltage source 25H, a medium voltage source 25M, and a low voltage source 25L. The high voltage source 25H can apply, e.g., 200 V to the voltage controller 26, the medium voltage source 25M can apply, e.g., 50 V, and the low voltage source 25L can apply, e.g., 15 V to it in this embodiment.

These three different voltages, 200 V, 50 V, and 15 V, are exclusively selected by the selector switch SW4 under the control of the system controller 22. The voltage selection is effected based upon the following criterion. When the burst drive mode is selected through the system controller 22, the burst wave number is determined in accordance with the diagnostic purpose and the available transducer characteristics, e.g., N=3. Accordingly, the selector switch SW4 is actuated by the control signal produced in the system controller 22 depending upon the above determination. For example, for the burst drive mode, the medium voltage source 25M is selected to apply 50 V to the voltage controlling element (adjuster) 26 VA. If the single drive pulse mode is selected, the high voltage of 200 V is selected, and if the CW drive pulse mode is selected, the low voltage of 15 V is derived.

The semiconductor controlling element 26 VA is constructed by an FET (field effect transistor) 26TR. The function of this element 26 VA is to adjust the drive pulse voltage derived from the selector switch SW4 by utilizing impedance changes of the source-to-drain current path of the FET 26TR, thereby finally obtaining the desirable drive pulse voltage.

A basic operation of the voltage controlling element 26 VA will now be described more in detail.

As previously described, in accordance with the selected drive mode and transducer characteristics, the control signal is supplied to the selector switch SW5 from the system controller 22. For example, as to the single pulse drive mode, the selector switch SW4 is changed to the high voltage source 26H to accept the high voltage of 200 V. In connection with such a voltage selection, another selector switch SW5 has been selected to series-connect a resistor R3 and a resistor R4 between the source of the FET 26TR and the ground. The former resistor R3 is connected parallel to the source-to-gate path of the FET 26TR. Accordingly, a given current flows through the series resistor connection R3 and R4 and the selector switch SW5 to the ground, which is defined by the input voltage, i.e., 200 V. Therefore, the gate voltage for the FET 26TR can be defined, whereby the internal impedance of the source-to-drain current path of the FET 26TR can be set to the desirable value. As a result, the output voltage, i.e., the drain voltage of the FET 26TR can be adjusted to obtain the desirable drive pulse voltage. In other words, the output voltage of the power source 25 is adjusted in the voltage controlling element 25 VA, and the desirable drive pulse voltage appears at the output of the voltage controller 26.

Figure 6:
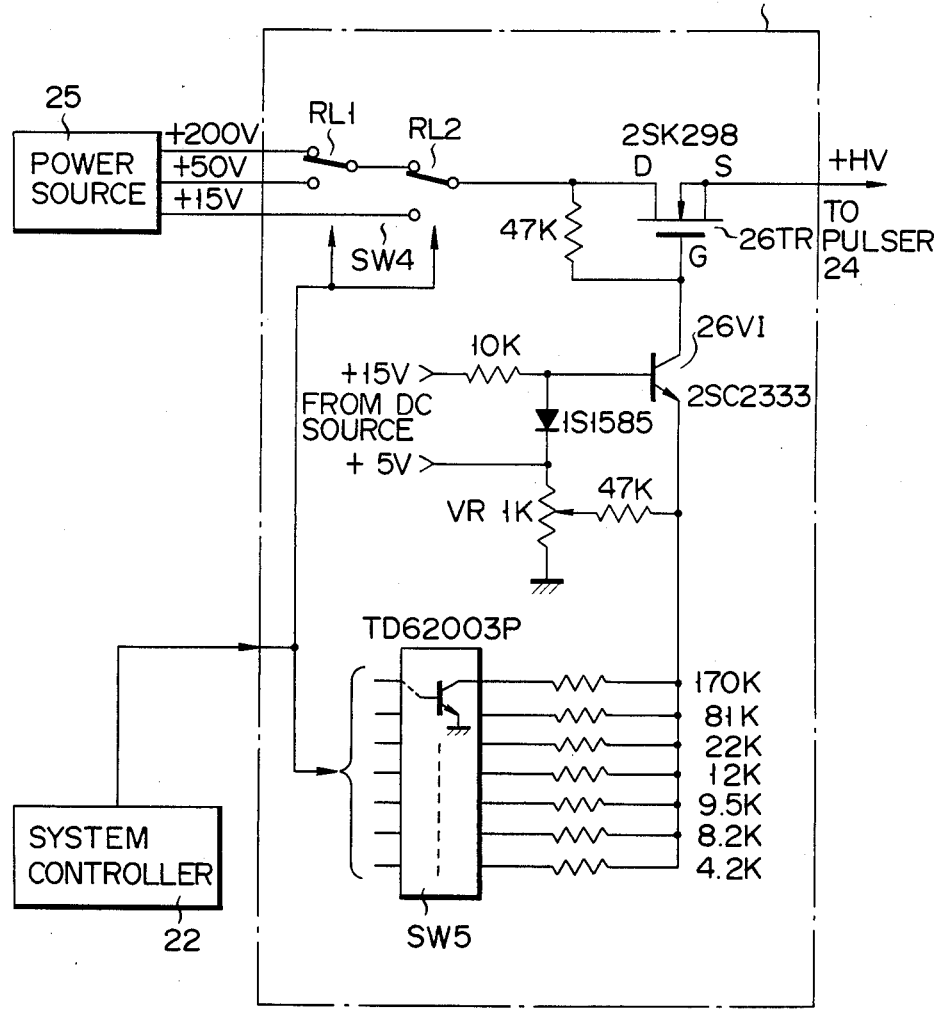
FIG. 6 is a circuit diagram of a practical circuit of the voltage controller employed in the apparatus shown in FIG. 1.

In FIG. 6, is shown a circuit diagram of the practical voltage controller 26 according to the invention.

In the circuit shown in FIG. 6, the voltage selection of the drive pulse voltage applied from the power source 25 is realized by employing series-connected relay contacts RL1 and RL2. That is to say, these relay contacts RL1 and RL2 have the same function as the selection switch SW4 shown in FIG. 5. A bipolar transistor 26VI (type No. 2SC2333) is connected between the gate electrode of the FET 26TR (type No. 2SK298), and the resistor network and the analogue switch SW5 (type No. TD62003P). The function of the bipolar transistor 26VI is to insulate the higher voltage (200 to 15 V) of the FET 25TR against the lower voltage (approximately 5 V) of the analogue switch SW5, i.e., the voltage insulator. Specifically, because the bipolar transistor 26VI is interposed between the voltage adjuster 26TR and the resistor network, such a higher voltage is not applied to the low-voltage operated analogue switch SW5. A variable resistor VR connected to the emitter side of the transistor 26VI performs the parameter adjustment of the bipolar transistor 26VI employed in this circuit.

As the remaining circuit function itself is well known, no further description is made.

The ultrasonic imaging apparatus according to the invention will now be summarized. When the burst drive mode is selected through the system controller 22, the desirable drive pulse voltage can be obtained by controlling the voltage controller 26 under the control of the system controller 22 in response to the wave number of the burst pulses, i.e., N=3. As a result, the average power of the ultrasonic pulses applied to the body under examination can be maintained at the maximum value and also the heat dissipation in the transducer elements can be suppressed within the allowable range without lowering the signal-to-noise ratio.

According to the invention, when the faster and slower bloodflow rates are measured by introducing the pulsed Doppler method, the drive voltages for the transducer 40 can be suitably adjusted in the voltage controller 26 by the system controller 22, depending on the rate frequencies. That is to say, in the faster bloodflow rate (the higher rate frequency), the drive voltage which has been used for the lower bloodflow rate can be reduced to a predetermined value in order to prevent the transducer 40 from being over-heated.

While in the slower bloodflow rate (the lower rate pulse frequency), the above-described drive voltage can be increased so as to drive the transducer 40 at its maximum efficiency. Accordingly, the above-mentioned advantages of the invention can be likewise provided in the measurement of the bloodflow rate.

Furthermore, even if the transducer 40 is driven under the linear scanning mode or the sector scanning mode, or other scanning modes such as the convex scanning mode, the same merits as in the above cases can be realized because the system controller 22 can independently deliver the suitable control signals for the scanning mode and the drive mode.

Numerous characteristics and advantages of the invention have been set forth in the foregoing description. It will be understood, of course, that this disclosure is, in many respects, only illustrative. Changes can be made in details, particularly in matters of shape, size, and arrangement of parts without exceeding the scope of the invention.

For instance, all circuit elements such as FET's SW2 and SW3 of the pulser 24 are manufactured in a hybrid integrated circuit.

The power MOSFET'S may be substituted by equivalent bipolar transistors.

If the voltage controller 26 can dynamically change the input drive pulse voltages with a wide range, only single power supply can be utilized. Since various voltage controlling methods are well known in the art, the ordinarily-skilled engineer may appreciate to introduce these methods into the voltage controller.

What is claimed is:

1. An ultrasonic imaging apparatus comprising:
   transducer means having a plurality of transducer elements arranged in an array for transmitting ultrasonic pulses toward an object under examination upon receipt of drive pulses, and for receiving ultrasonic echoes reflected from the object, thereby producing echo signals;

transmitter means including generator means for generating rate pulses, generator means for generating trigger pulses in response to the rate pulses, source means for producing drive voltages for the transducer means, control means for controlling the drive voltages so as to obtain the drive pulses having a desirable mode, and pulser means for supplying to the transducer elements the drive pulses having the desirable mode upon receipt of the trigger pulses;

receiver means coupled to the transducer means for processing the echo signals so as to produce tomographic image signals; and means for displaying tomographic images of the object scanned by the ultrasonic pulses based upon the tomographic image signals.

2. An apparatus as claimed in claim 1, wherein the pulser means includes:

storage means for charging the drive voltages applied from the source means via the control means; and semiconductor switching means connected parallel to the transducer elements via the storage means, the switching means being turned on upon receipt of the trigger pulses to apply the drive pulses to the transducer elements.

3. An apparatus as claimed in claim 2, wherein the storage means is a capacitor, and the switching means is a power MOSFET.

4. An apparatus as claimed in claim 1, wherein the pulser means includes:

first semiconductor switching means connected to receive the drive voltages of the control means; and second semiconductor switching means series-connected to the first semiconductor switching means, whose current path is connected parallel to the transducer element, the second semiconductor switching means being turned off upon receipt of the trigger pulses while the first semiconductor switching means is turned on, thereby applying the drive pulses to the transducer elements.

5. An apparatus as claimed in claim 4, wherein the first semiconductor switching means is a P-channel MOSFET and the second semiconductor switching means is an N-channel MOSFET.

6. An apparatus as claimed in claim 1, wherein the control means includes at least a semiconductor voltage controlling element whose current path is connected between the source means and the pulser means and whose internal impedance is controllable in accordance with the desirable drive pulse mode.

7. An apparatus as claimed in claim 6, further comprising variable resistor means connected to the semiconductor voltage controlling element so as to control the internal impedance of the semiconductor voltage controlling element.

8. An apparatus as claimed in claim 6, further comprising voltage selecting means interposed between the source means and the semiconductor voltage controlling element so as to select the desirable drive voltage applied from the source means.

9. An apparatus as claimed in claim 6, wherein the semiconductor voltage controlling element is a field effect transistor.

10. An apparatus as claimed in claim 7, wherein the variable resistor means is constructed by a resistor network and an analogue switch array.

11. An apparatus as claimed in claim 8, wherein the voltage selecting means is constructed by series-connected relay contacts.

12. An apparatus as claimed in claim 7, wherein a semiconductor voltage insulator is interposed between the semiconductor voltage controlling element and the variable resistor means.

13. An apparatus as claimed in claim 12, wherein the semiconductor voltage insulator is a bipolar transistor.

* * * * *